United States Patent [19]
Bakowski et al.

[11] Patent Number: 5,702,321
[45] Date of Patent: Dec. 30, 1997

[54] FULL-TIME TRANSFER CASE WITH SYNCHRONIZED RANGE SHIFT MECHANISM AND ON-DEMAND DIFFERENTIATION CONTROL

[75] Inventors: Richard A. Bakowski, Warners; Richard E. Eastman, Central Square, both of N.Y.

[73] Assignee: New Venture Gear, Inc., Troy, Mich.

[21] Appl. No.: 671,046

[22] Filed: Jun. 25, 1996

[51] Int. Cl.$^6$ ............................................. F16H 48/02
[52] U.S. Cl. ........................................ 475/199; 180/249
[58] Field of Search ................................ 475/199, 206, 475/218; 180/248, 249

[56] References Cited

U.S. PATENT DOCUMENTS

| | | |
|---|---|---|
| 3,845,671 | 11/1974 | Sharp et al. . |
| 3,848,691 | 11/1974 | Dolan . |
| 4,031,780 | 6/1977 | Dolan et al. . |
| 4,103,753 | 8/1978 | Holdeman . |
| 4,215,593 | 8/1980 | Shono et al. . |
| 4,344,335 | 8/1982 | Kawai . |
| 4,347,762 | 9/1982 | Holdeman . |
| 4,440,042 | 4/1984 | Holdeman . |
| 4,552,241 | 11/1985 | Suzuki . |
| 4,569,252 | 2/1986 | Harper . |
| 4,644,822 | 2/1987 | Batchelor . |
| 4,677,873 | 7/1987 | Eastman et al. . |
| 4,677,875 | 7/1987 | Batchelor . |
| 4,718,303 | 1/1988 | Fogelberg . |
| 4,770,280 | 9/1988 | Frost . |
| 4,776,444 | 10/1988 | Worner et al. . |
| 4,805,484 | 2/1989 | Hiraiwa . |
| 4,821,591 | 4/1989 | Adler . |
| 4,848,508 | 7/1989 | Smirl et al. . |
| 4,860,612 | 8/1989 | Dick et al. . |
| 4,883,138 | 11/1989 | Kameda et al. . |
| 4,976,671 | 12/1990 | Anderson . |
| 5,036,940 | 8/1991 | Takemura ........................ 180/249 |
| 5,046,998 | 9/1991 | Frost . |
| 5,054,335 | 10/1991 | Andrews . |
| 5,076,112 | 12/1991 | Williams . |
| 5,284,068 | 2/1994 | Frost . |
| 5,323,871 | 6/1994 | Wilson et al. . |
| 5,346,442 | 9/1994 | Eastman . |
| 5,411,447 | 5/1995 | Frost . |

OTHER PUBLICATIONS

"Automotive Handbook", Published By: Robert Bosch GmbH, 1986, Postfach 50, D–7000 Stuttgart 1, Automotive Equipment Product Group, Dept For Technical Information.

*Primary Examiner*—Dirk Wright
*Attorney, Agent, or Firm*—Harness, Dickey & Pierce, P.L.C.

[57] ABSTRACT

A power transfer system is disclosed for a full-time four-wheel drive vehicle. The power transfer system includes a layshaft gear reduction unit that is operable for establishing high-range and low-range speed ratios, and a synchronized range shift mechanism that is adapted to permit the vehicle operator to shift on-the-fly for establishing full-time high-range and low-range four-wheel drive modes. The power transfer system includes an slip limiting/torque-biasing arrangement including an interaxle differential and a transfer clutch operable for controlling the magnitude of speed differentiation and torque biasing across the interaxle differential.

19 Claims, 10 Drawing Sheets

FULL-TIME TRANSFER CASE WITH SYNCHRONIZED RANGE SHIFT MECHANISM AND ON-DEMAND DIFFERENTIATION CONTROL

BACKGROUND OF THE INVENTION

The present invention relates to a power transfer system for controlling the distribution of drive torque between the front and rear wheels of a four-wheel drive vehicle.

Due to increased consumer demand for four-wheel drive vehicles, a plethora of different power transfer systems am currently utilized for directing power (i.e., drive torque) to all four wheels of the vehicle. For example, in many "part-time" power transfer systems, a transfer case is incorporated into the driveline and is normally operable in a two-wheel drive mode for delivering drive torque to the driven wheels. When four-wheel drive is desired, a mode shift mechanism can be selectively actuated by the vehicle operator for directly coupling the non-driven wheels to the driven wheels for establishing a part-time four-wheel drive mode. As will be appreciated, motor vehicles equipped with such a part-time power transfer systems offer the vehicle operator the option of selectively shifting between the two-wheel drive mode during normal road conditions and the part-time four-wheel drive mode for operation under adverse road conditions. An example of a part-time transfer case is disclosed in commonly-owned U.S. Pat. No. 4,770,280 to Frost.

Alternatively, it is known to use "on-demand" power transfer systems for automatically directing power to the non-driven wheels, without any input or action on the part of the vehicle operator, when traction is lost at the driven wheels. Modernly, the on-demand feature is incorporated into the transfer case by replacing the mode shift mechanism with a clutch assembly that is interactively associated with an electronic control system and a sensor arrangement. During normal road conditions, the clutch assembly is maintained in a non-actuated condition such that drive torque is only delivered to the driven wheels. However, when the sensors detect a low traction condition at the driven wheels, the clutch assembly is automatically actuated to deliver drive torque on-demand to the non-driven wheels. Moreover, the amount of drive torque transferred through the clutch assembly to the non-driven wheels can be varied as a function of specific vehicle dynamics, as detected by the sensor arrangement. One example of such an "on-demand" power transfer system is disclosed in commonly-owned U.S. Pat. No. 5,323,871 to Wilson et al wherein the electronically-controlled clutch assembly is operable for automatically controlling the amount of drive torque transferred to the non-driven wheels as a function of the wheel speed difference (i.e., the wheel slip) between the driven and non-driven wheels.

As a further alternative, some vehicles are equipped with full-time power transfer system having a transfer case equipped with a center differential that functions to permit interaxle speed differentiation while transferring drive torque to both of the front and rear drivelines. To minimize loss of traction due to wheel slippage, full-time transfer cases are typically equipped with a slip limiting device for locking the center differential to prevent speed differentiation and, in effect, establishing a part-time four-wheel drive mode. Examples of manually-actuated differential lock-up arrangements are disclosed in commonly-owned U.S. Pat. No. 3,848,691 to Dolan and U.S. Pat. No. 4,677,873 to Eastman. An automatic differential lock-up arrangement is disclosed in commonly-owned U.S. Pat. No. 3,845,671 to Sharp et al. wherein an electrically-controlled clutch assembly is actuated to lock-up the center differential when speed differentiation due to a wheel slip condition is detected as exceeding a predetermined value. In addition, torque-biasing differential lock-up arrangements are disclosed in commonly-owned U.S. Pat. No. 4,031,780 to Dolan et al. and U.S. Pat. No. 5,046,998 to Frost, which both utilize a viscous coupling to progressively modify the torque distribution in proportion to the magnitude of the speed differentiation across the center differential. Finally, electronically-controlled full-time transfer cases are disclosed in U.S. Pat. No. 4,718,303 to Fogelberg and U.S. Pat. No. 4,860,612 to Dick et al. wherein an electromagnetic biasing clutch is provided across the center differential to controllably bias the torque delivered to the front and rear drivelines in response to wheel slip.

To accommodate differing road surfaces and conditions, many of the above-referenced transfer cases are equipped with a gear reduction unit for providing high-range (i.e., direct drive) and low-range (i.e., reduced ratio drive) speed ratios in conjunction with the various four-wheel drive modes. Most commonly, the gear reduction units used in such dual-speed transfer cases include either a layshaft arrangement or a planetary gear assembly. However, in most current four-wheel drive vehicles, the transfer case can only be shifted between the four-wheel low-range drive mode and the four-wheel high-range drive mode when the motor vehicle is in a substantially non-motive condition. Unfortunately, the need to stop the vehicle prior to shifting between the available four-wheel drive speed ranges is inconvenient, particularly upon encountering road conditions or surface terrain where continuation of the vehicle's rolling momentum would assist in overcoming the conditions encountered. As such, gear reduction units have been designed which permit the vehicle operator to shift "on-the-fly" from the four-wheel low-range drive mode into the four-wheel high-range drive mode without stopping the vehicle. For example, U.S. Pat. No. 5,054,335 to Andrews discloses a transfer case having a synchronized shift arrangement for a layshaft-type gear reduction unit while commonly-owned U.S. Pat. No. 5,346,442 to Eastman discloses a transfer case having a synchronized shift arrangement for a planetary-type gear reduction unit. However, while both designs advance the art, the need still exists to develop a gear reduction unit that can also be shifted "on-the-fly" from the four-wheel high-range drive mode into the four-wheel low-range drive mode.

SUMMARY OF THE INVENTION

It is therefore an object of the present invention to provide an improved power transfer system for use in four-wheel drive vehicles having a transfer case equipped with a clutch assembly for controlling the torque delivered to the front and rear wheels.

According to a preferred embodiment, the power transfer system of the present invention is operable for establishing a full-time four-wheel drive mode and includes a transfer case having an interaxle differential and a clutch assembly arranged to control speed differentiation and torque biasing across the interaxle differential, sensors for detecting and generating input signals indicative of various dynamic and operational characteristics of the vehicle, and a controller for controlling actuation of the clutch assembly in response to the sensor input signals. Under a first "on-demand" control scheme, the actuated condition of the clutch assembly is automatically changed from a non-actuated state to a fully-actuated state when the sensor input signals indicate the occurrence of a vehicular condition exceeding a predefined threshold value. Under a second "on-demand" control scheme, the actuated condition of the clutch assembly is controllably varied between its non-actuated and fully-actuated limits as a function of changes in the magnitude of one or more vehicular conditions detected by the sensors.

In addition to "on-demand" control of the clutch assembly, the power transfer system of the present invention is further adapted to establish a part-time four-wheel drive mode. To this end, a mode select mechanism is provided for permitting selection of either of the full-time or part-time four-wheel drive modes and generating a mode signal indicative thereof. The mode signal is delivered to the controller for controlling actuation of the clutch assembly. When the full-time four-wheel drive mode is selected, the clutch assembly is automatically controlled under one of the above-noted on-demand control schemes. In contrast, when the part-time four-wheel drive mode is selected, the clutch assembly is shifted into and maintained in its fully-actuated condition.

In accordance with a further feature of the present invention, the transfer case is equipped with a layshaft-type gear reduction unit and a synchronized range shift mechanism that permit "on-the-fly" shifting between the available four-wheel high-range and low-range drive modes.

As a further feature of the present invention, the transfer case is equipped with a gerotor-type pump assembly for delivering pressurized fluid from a sump area to a hydraulically-actuated clutch assembly, and a control valve for controlling the delivery of such pressurized fluid to the clutch assembly.

BRIEF DESCRIPTION OF THE DRAWINGS

Further objects, features and advantages of the present invention will become apparent to those skilled in the art from analysis of the following written description, the accompanying drawings and the appended claims in which:

DETAILED DESCRIPTION OF THE INVENTION

Figure 1:
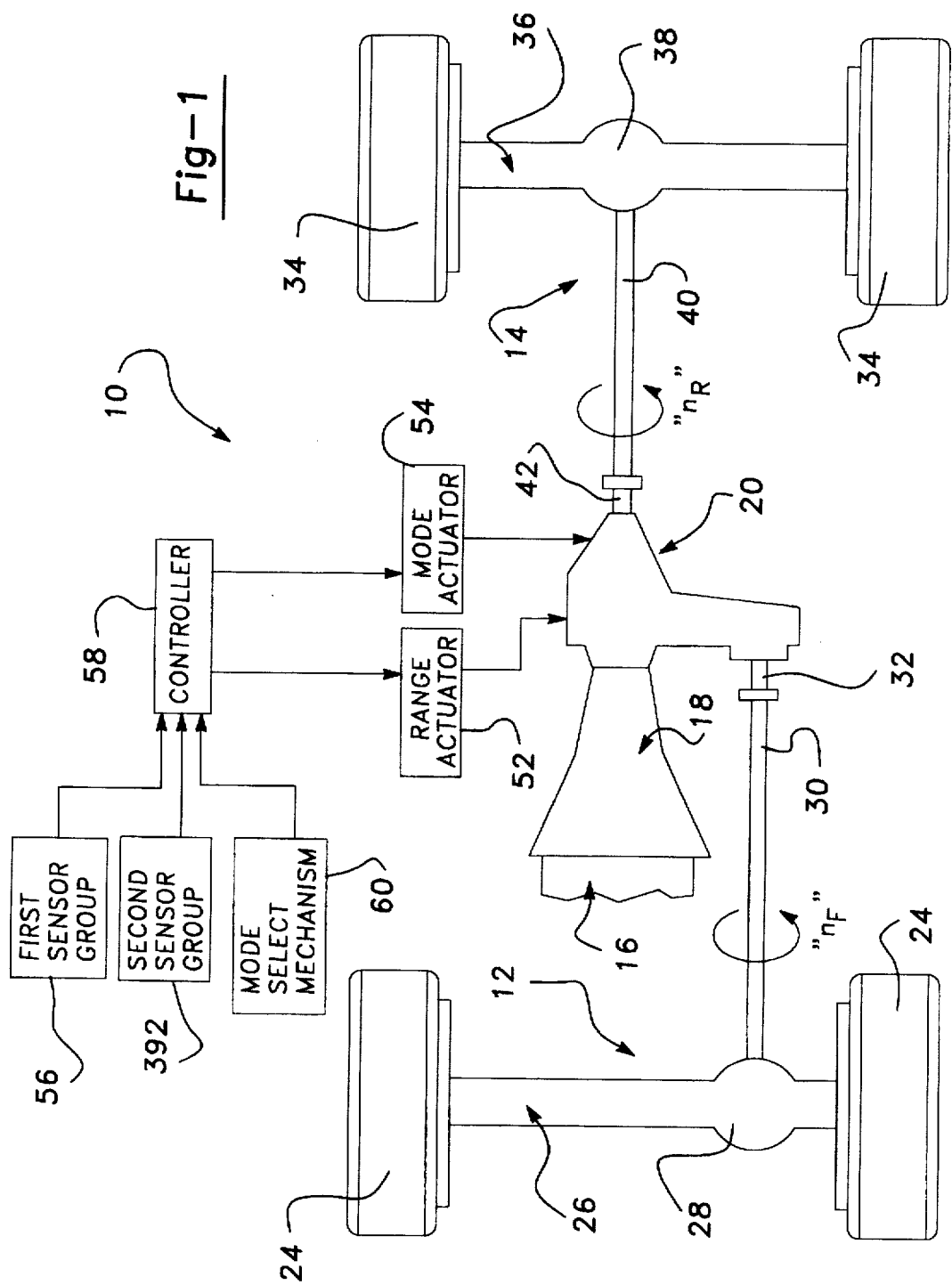
FIG. 1 is a schematic representation of a four-wheel drive motor vehicle equipped with the power transfer system of the present invention.

Referring now to the drawings, a drivetrain for a four-wheel drive vehicle is schematically shown interactively associated with a power transfer system 10 of the present invention. The motor vehicle drivetrain includes a front driveline 12 and a rear driveline 14 both drivable from a source of power, such as an engine 16, through a transmission 18 which may be of either the manual or automatic type. In the particular embodiment shown, the drivetrain is an all-wheel drive system which incorporates a transfer case 20 for transmitting drive torque from engine 16 and transmission 18 to front driveline 12 and rear driveline 14. Front driveline 12 includes a pair of front wheels 24 connected at opposite ends of a front axle assembly 26 having a front differential 28 that is coupled to one end of a front prop shaft 30, the opposite end of which is coupled to a front output shaft 32 of transfer case 20. Similarly, rear driveline 14 includes a pair of rear wheels 34 connected at opposite ends of a rear axle assembly 36 having a rear differential 38 coupled to one end of a rear prop shaft 40, the opposite end of which is interconnected to a rear output shaft 42 of transfer case 20. As will be detailed hereinafter with greater specificity, transfer case 20 is equipped with a layshaft-type gear reduction unit 44, a synchronized range shift mechanism 46, and "slip limiting/torque-biasing" arrangement 48 including an interaxle (i.e., center) differential 22 operably interconnecting front output shaft 32 and rear output shaft 42 and a transfer clutch 50 for controlling the speed differentiation and torque biasing across center differential 22.

Power transfer system 10 further includes a first or "range" actuator 52 for actuating synchronized range shift mechanism 46, a second or "mode" actuator 54 for actuating transfer clutch 50, a first sensor group 56 for sensing specific dynamic and operational characteristics of the motor vehicle and generating sensor input signals indicative thereof, and a controller 58 for generating control signals in response to the sensor input signals. In particular, controller 58 is adapted to control the actuated condition of range shift mechanism 46 and transfer clutch 50 by sending control signals to range and mode actuators 52 and 54, respectively. Finally, power transfer system 10 also includes a mode select mechanism 60 for permitting the vehicle operator to select one of the available four-wheel drive modes.

With particular reference now to FIGS. 2 through 8, a preferred construction for transfer case 20 will now be described. Transfer case 20 is shown to include a housing 62 formed by a series of modular sections which are suitably interconnected by a plurality of threaded fasteners 64. An input shaft 66 is shown rotatably supported in housing 62 via a bearing assembly 68. A transmission output shaft, partially shown at 70, is coupled (i.e., splined) to input shaft 66 such that both are rotatably driven by engine 16 of the motor vehicle. Layshaft gear reduction unit 44 is operably installed between input shaft 66 and a quill shaft 72 which, in turn, is shown rotatably supported by suitable bearings 74 on a forward portion of rear output shaft 42. As will be detailed, layshaft gear reduction unit 44 is operable in a "high-range" drive mode for driving quill shaft 72 at a direct speed ratio (i.e., 1:1) relative to input shaft 66. In addition, layshaft gear reduction unit 44 is also operable in a "low-range" drive mode for driving quill shaft 72 at a reduced speed ratio (i.e., 0.50:1) relative to input shaft 66. Finally, layshaft gear reduction unit 44 is operable in a "Neutral" non-driven mode for interrupting the transfer of drive torque from input shaft 66 to quill shaft 72.

Figure 2:
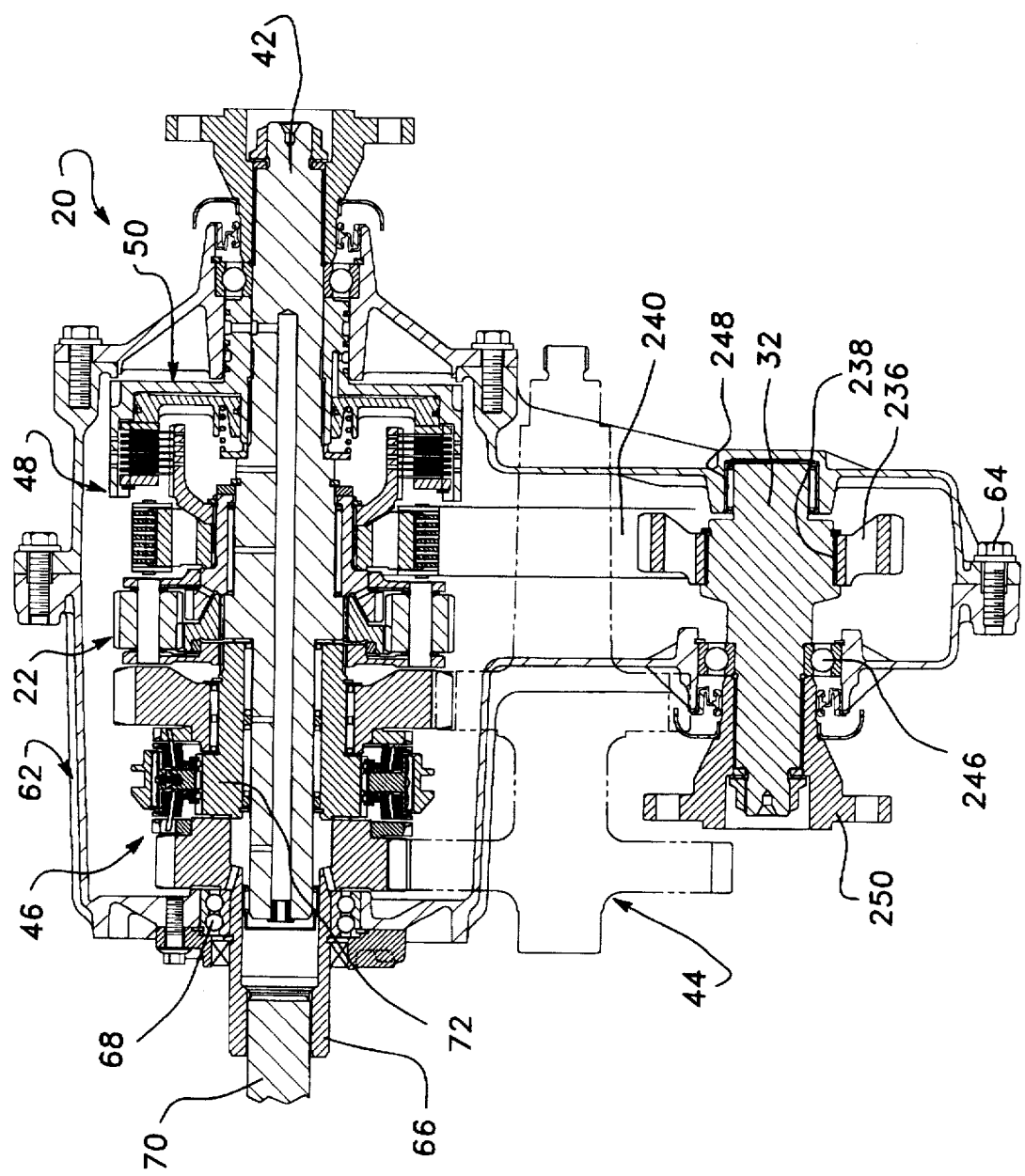
FIG. 2 is a cross-sectional view illustrating the full-time transfer case of the present invention.
Figure 3:
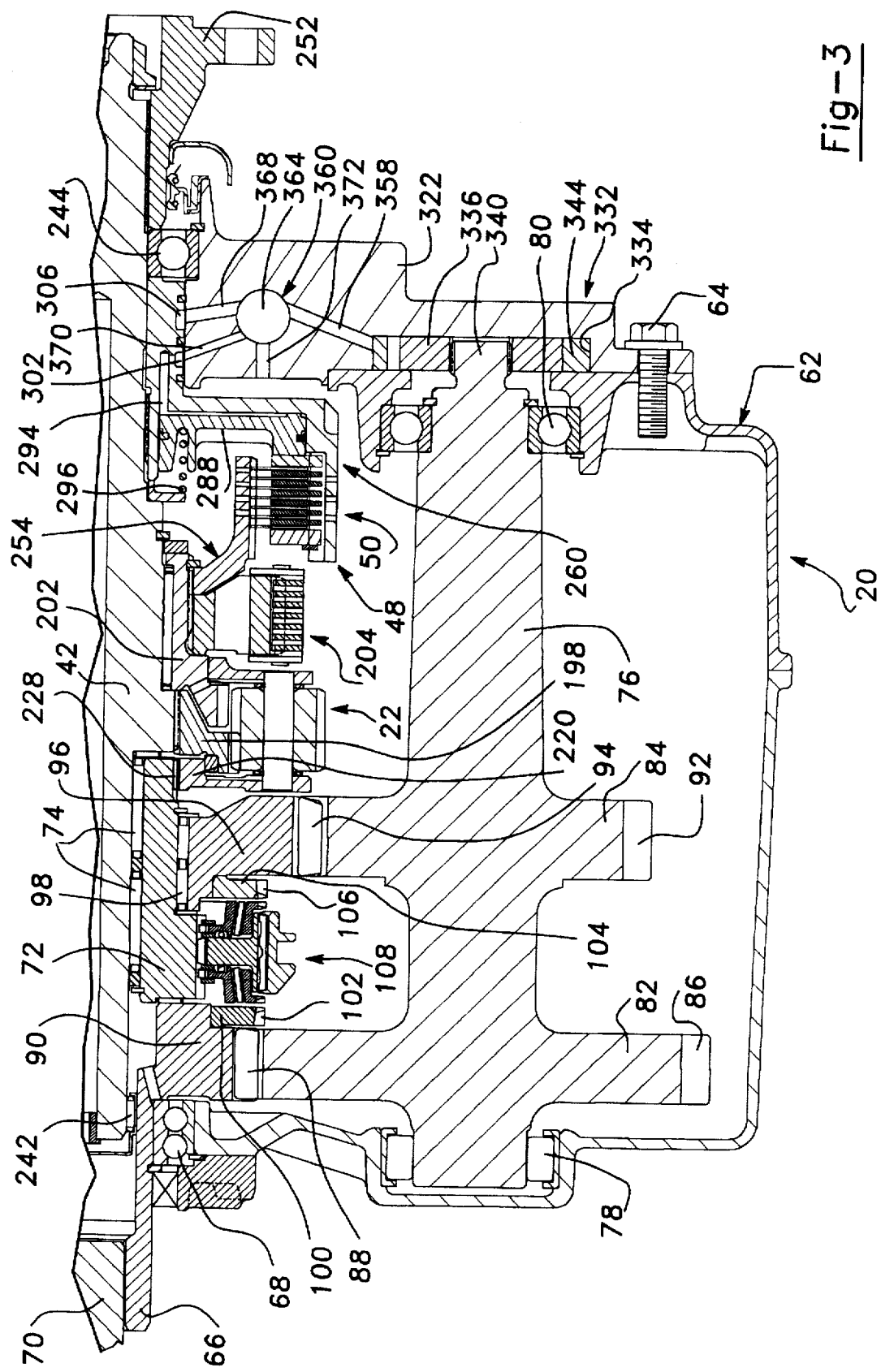
FIG. 3 is a partial cross-sectional view of the full-time transfer case showing its layshaft gear reduction unit and pump assembly in greater detail.

As best seen from FIGS. 2 and 3, layshaft gear reduction unit 44 includes a layshaft 76 rotatably supported from housing 62 via bearing assemblies 78 and 80 and which has first and second gears 82 and 84, respectively, formed thereon. Teeth 86 on first gear 82 are shown to be in constant meshed engagement with teeth 88 of a high-range gear 90 formed integrally with input shaft 66. Similarly, teeth 92 on second gear 84 are shown to be in constant meshed engagement with teeth 94 of a low-range gear 96 that is rotatably supported via bearing assembly 98 on quill shaft 72. The number of teeth associated with the two constant mesh gearsets are selected to cause low-range gear 96 to be driven at the desired reduced speed ratio relative to input shaft 66 and high-range gear 90. In addition, a first clutch plate 100 having clutch teeth 102 is shown to be fixedly secured (i.e., splined, pressfit, welded, etc.) to high-range gear 90 while a second clutch plate 104 having clutch teeth 106 is shown to be similarly fixed to reduced-ratio gear 96.

According to the present invention, synchronized range shift mechanism 46 is provided in conjunction with layshaft gear reduction unit 44 and is operable for permitting transfer case 20 to be shifted "on-the-fly" between four-wheel high-range and low-range drive modes. In particular, synchronized range shift mechanism 46 includes a bi-directional synchronizer clutch apparatus 108 that is operable for selectively coupling quill shaft 72 to one of clutch plates 100 and 104, and a shift assembly 109 interconnecting clutch apparatus 108 to range actuator 52. As best seen from FIG. 4, synchronizer clutch apparatus 108 includes a hub 110 that is fixed (i.e., splined) to a radial flange segment 112 of quill shaft 72 and axial retained thereon via a pair of retaining rings 114. Hub 110 has an outer cylindrical rim 116 on which external longitudinal splines 118 are formed. Synchronizer clutch apparatus 108 also includes a plurality of struts 120 (one shown), each being retained for longitudinal movement in one of a series of circumferentially-spaced cutouts formed through outer cylindrical rim 116 of hub 110. Moreover, each strut 120 is biased in a radially outward direction by an energizing spring 122. Synchronizer clutch apparatus 108 also includes a range sleeve 124 having internal longitudinal splines 126 that mesh with external splines 118 on hub 110. Thus, range sleeve 124 is supported for rotation with and axial sliding movement on hub 110. Splines 126 include a central detent groove 128 that is provided for centering range sleeve 124 on humps 130 of struts 120 so as to define a centered Neutral position (shown and designated by position line "N" in FIG. 4).

Synchronizer clutch apparatus 108 further includes a first synchronizer assembly 132 for establishing speed synchronization between input shaft 66 and quill shaft 72 prior to permitting movement of range sleeve 124 to a high-range position (denoted by position line "H" in FIG. 4) whereat its splines 126 meshingly engage clutch teeth 102 of first clutch plate 100 for establishing a direct drive connection therebetween. Thus, with range sleeve 124 positioned in its high-range position, the high-range drive mode is established between input shaft 66 and quill shaft 72. Similarly, a second synchronizer assembly 134 is provided for establishing speed synchronization between low-range gear 96 and quill shaft 72 prior to permitting range sleeve 124 to move to a low-range position (denoted by position line "L" in FIG. 4) whereat its splines 126 meshingly engage clutch teeth 106 of second clutch plate 104 for establishing a reduced-ratio drive connection therebetween. Accordingly, with range sleeve 124 positioned in its low-range position, the low-range drive mode is established between input shaft 66 and quill shaft 72.

First synchronizer assembly 132 is a dual-cone arrangement including an inner ring 136 fixed (i.e., splined) to flange segment 112 of mainshaft 72 and located thereon by retainer ring 138, a blocker ring 140 having blocking teeth 142, and a reaction ring 144 located between inner ring 136 and blocker ring 140. Reaction ring 144 has a lower conical surface supported for limited axial and rotational movement on an external cone surface of inner ring 136 and an upper conical surface similarly supported on an internal cone surface of blocker ring 140. Axial lugs 154 on reaction ring 144 are nested within apertures 156 formed in first clutch plate 100, thereby coupling reaction ring 144 for rotation with input shaft 66. Blocker ring 140 is rotatably restrained by rim portion 116 for rotation with hub 110. A more detailed description of a similar dual-cone arrangement can be found in commonly-owned U.S. Pat. Nos. 5,085,303 and 5,335,087 to Frost, both of which are hereby incorporated by reference. Moreover, since the components of second synchronizer assembly 134 are identical or substantially similar to those described above, like numbers having a primed designation are used for identification thereof. Finally, while a particular bi-directional dual-cone synchronizer design has been described, it will be understood that any equivalent device can be readily used for permitting "on-the-fly" shifting between available speed ranges.

When it is desired to establish the high-range drive connection between input shaft 66 and quill shaft 72, range sleeve 124 is moved toward first clutch plate 100. Such movement energizes first synchronizer assembly 132, whereby struts 120 act on blocker ring 140 which, in turn, causes blocker teeth 142 to index and prevent further movement of range sleeve 124 until speed synchronization is established between high-range gear 90 and quill shaft 72. Upon completion of speed synchronization, spline teeth 126 of range sleeve 124 are permitted to pass through blocker teeth 142 and into a position of meshed engagement with clutch teeth 102 on first clutch plate 100, thereby establishing the high-range drive mode between input shaft 66 and quill shaft 72 and locating range sleeve 124 in its high-range position. When it is desired to shift transfer case 20 into its Neutral mode, range sleeve 124 is moved to its centered neutral position. In this position, clutch hub 110 and quill shaft 72 are uncoupled from high-range gear 90 and low-range gear 96. As a result, quill shaft 72 is maintained in a non-driven state. Finally, when it is desired to establish the low-range drive connection between input shaft 66 and quill shaft 72, range sleeve 124 is moved toward second clutch plate 104. Such movement energizes second synchronizer assembly 134. Upon speed synchronization between quill shaft 72 and low-range gear 96, range sleeve splines 126 are free to pass through blocking teeth 142' on blocker ring 140' and into meshed engagement with clutch teeth 106 on second clutch plate 104, thereby establishing the low-range drive mode between input shaft 66 and quill shaft 72 and locating range sleeve 124 in its low-range position.

Figure 4:
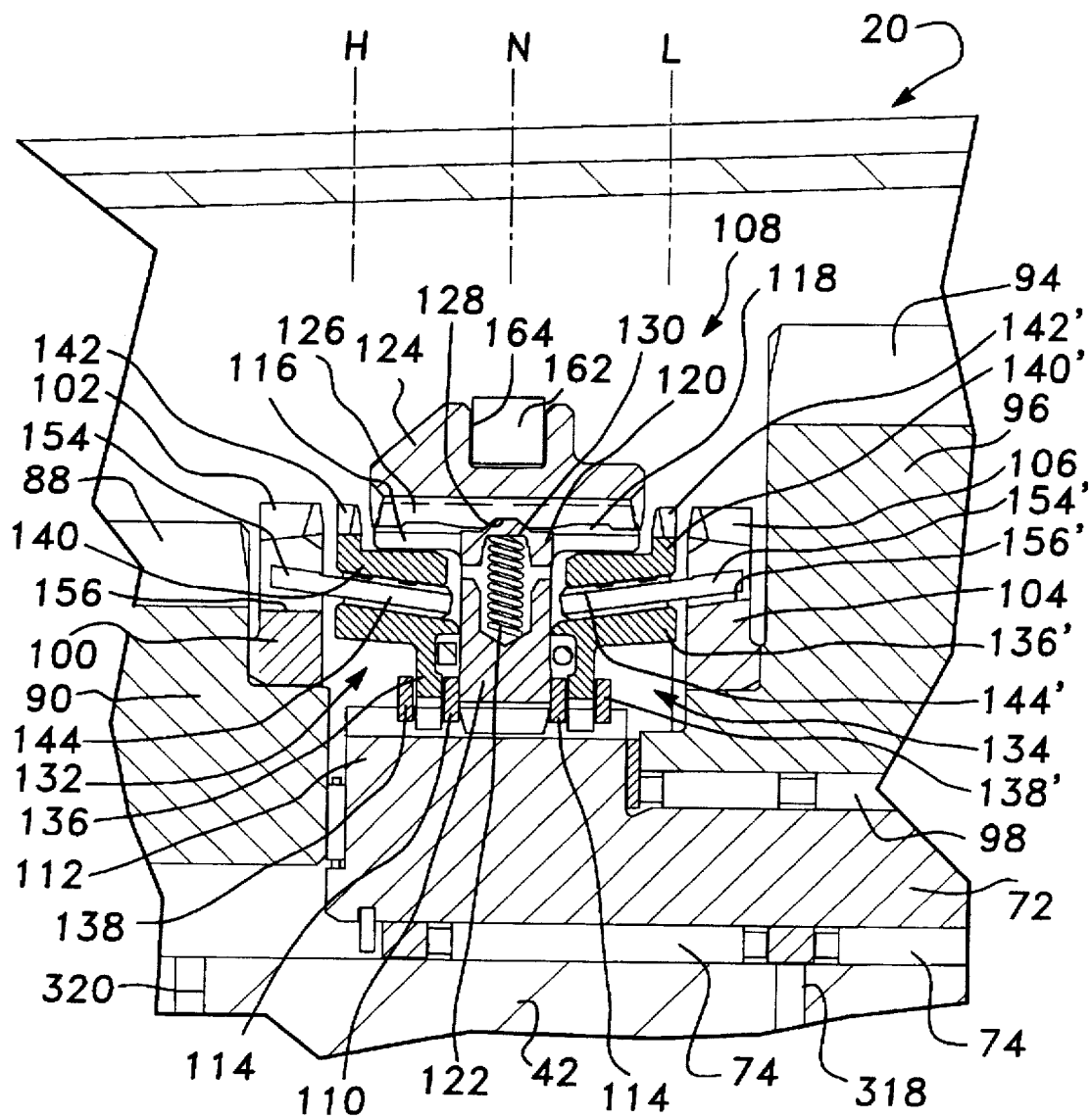
FIG. 4 is an enlarged fragmentary view of FIG. 2 illustrating various components of the synchronized range shift mechanism in greater detail.
Figure 5:
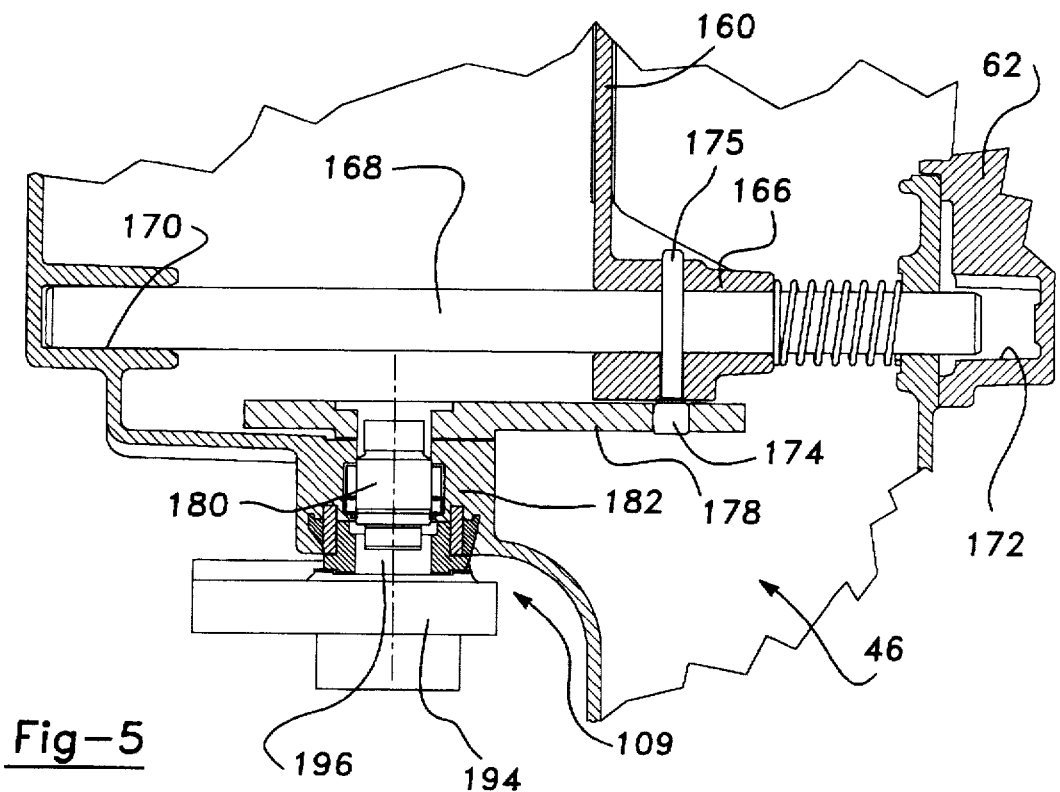
FIG. 5 is a fragmentary sectional view of the full-time transfer case showing additional components of the synchronized range shift mechanism.
Figure 6:
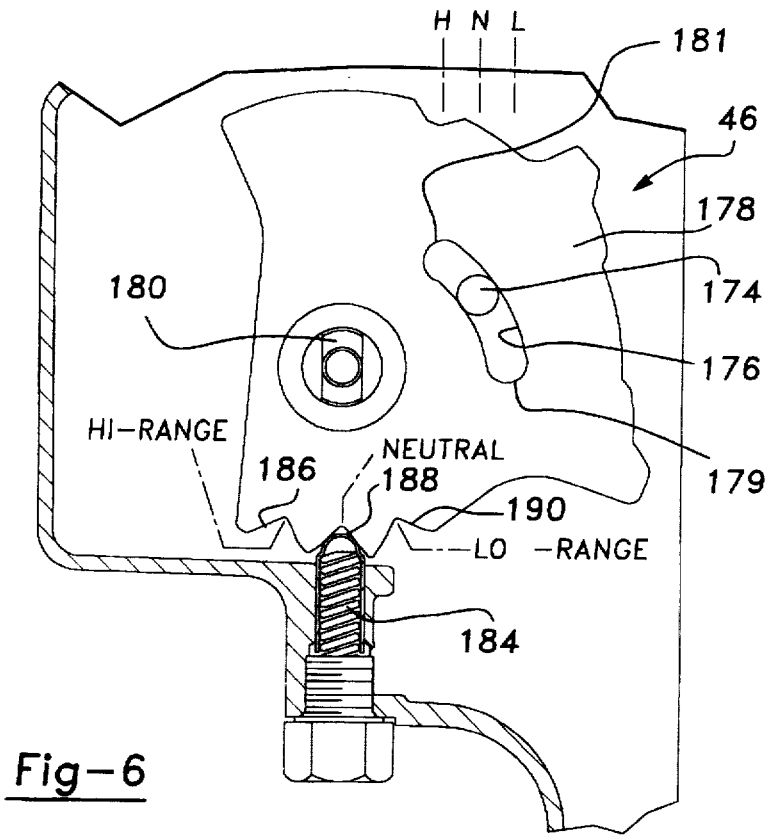
FIG. 6 is a side view of the sector plate associated with the synchronized range shift mechanism.

Referring particularly to FIGS. 4 through 6, means are shown for moving range sleeve 124 between its three distinct positions. Specifically, shift assembly 109 of synchronized range shift mechanism 46 is shown to include a shift fork 160 having projections 162 that are retained in a groove 164 formed in range sleeve 124. Shift fork 160 also includes a tubular segment 166 that is fixedly connected to a shift rail 168, the opposite ends of which are supported in sockets 170 and 172 formed in housing 62 for sliding movement relative thereto. A roller 174 mounted to a pin 175 fixed to tubular segment 166 of shift fork 160 is retained in a range slot 176 formed in a sector plate 178. Sector plate 178 is fixed to a shaft 180 which, in turn, is supported for rotation in a socket portion 182 of housing 62. The contour of range slot 176 is such that rotation of sector plate 178 causes corresponding axial movement of shift fork 160 and range sleeve 124. Sector plate 178 can be rotated to one of three distinct sector positions, as labelled HI-RANGE, NEUTRAL and LO-RANGE. When sector plate 178 is rotated to its HI-RANGE sector position, roller pin 174 is located in close proximity to terminal end 179 of range slot 176, a spring-biased poppet 184 is located in a first detent 186, and range sleeve 124 is located in its high-range position. When sector plate 178 is rotated to its NEUTRAL sector position shown, roller pin 174 is centrally located within range slot 176, poppet 184 is located in a second detent 188, and range sleeve 124 is located in its Neutral position. Finally, when sector plate 178 is in its LO-RANGE sector position, roller pin 174 is located in close proximity to terminal end 181 of range slot 176, poppet 184 is located in a third detent 190, and range sleeve 124 is located in its low-range position.

Sector plate 178 can be rotated between its various sector positions "on-the-fly" due to use of synchronizer clutch apparatus 108. Range actuator 52 is coupled to shaft 180 for controlling rotation of sector plate 178. While range actuator 52 can be any suitable mechanically-actuated or electrically-actuated shift system, the present invention is preferably directed to use of an electrically-actuated rotary device, such as a gearmotor 194. As seen in FIG. 6, output 196 of gearmotor 194 is coupled to shaft 180. Thus, the direction and magnitude of rotation of sector plate 178 is controlled in response to electrical control signals sent to gearmotor 194 by controller 58 for rotating output 196. As will be detailed, controller 58 functions to coordinate actuation of range actuator 52 and mode actuator 54 for establishing various four-wheel drive modes.

Figure 7:
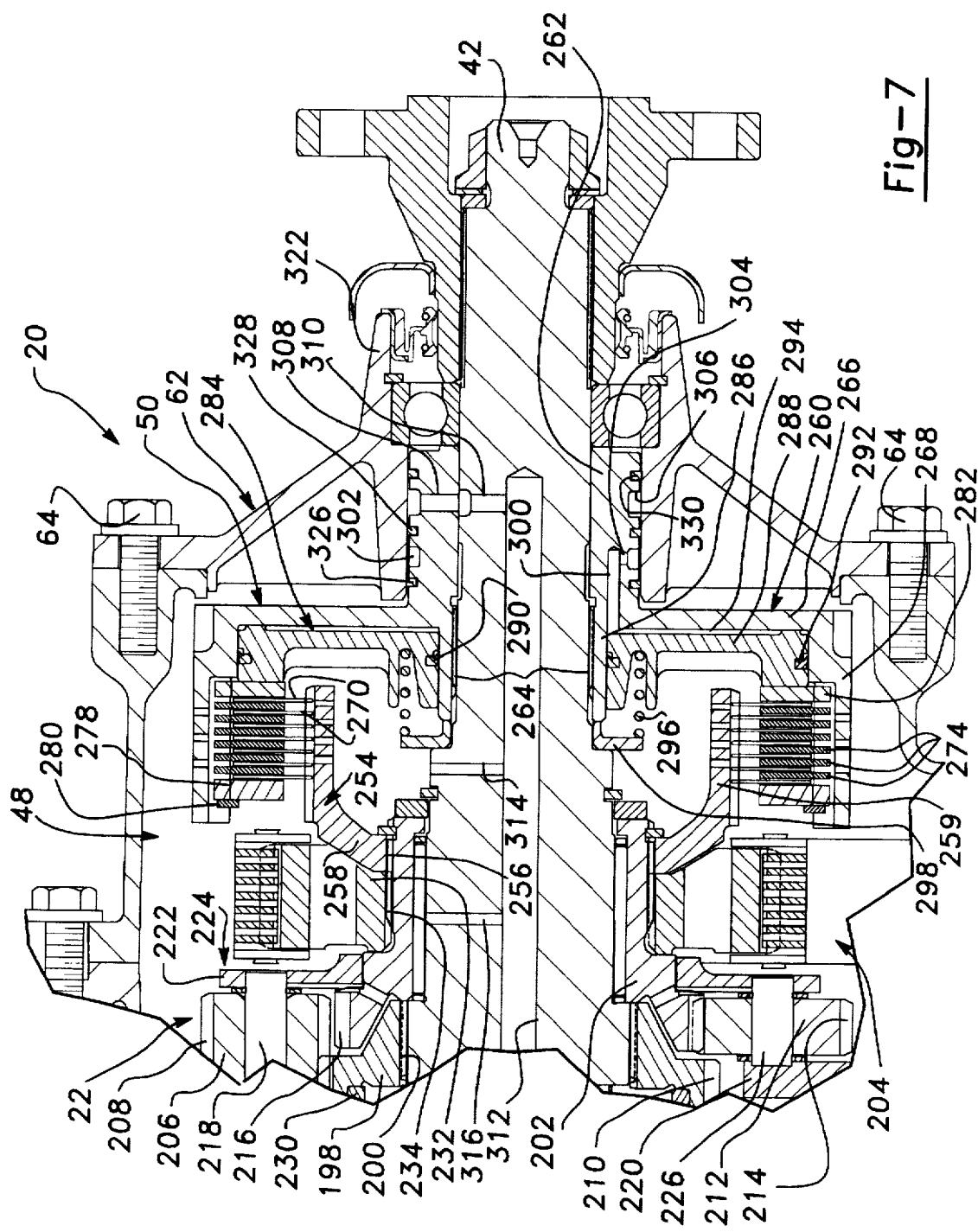
FIG. 7 is another enlarged fragmentary view of FIG. 2 showing the interaxle differential and clutch assembly.
Figure 8:
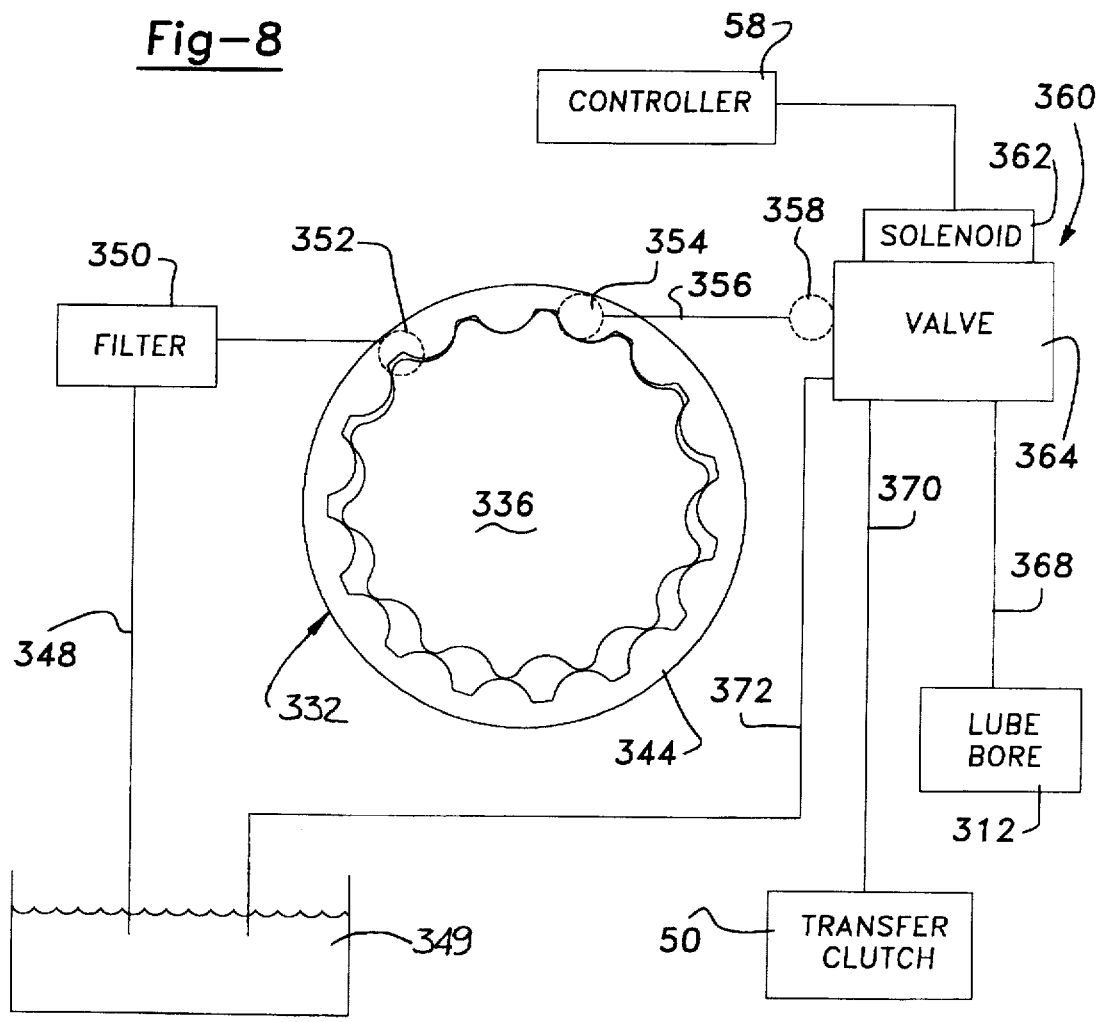
FIG. 8 is a schematic view of a control system used for controlling actuation of the transfer clutch.

With particular reference now to FIGS. 2, 3 and 7, the various components associated with slip limiting/torque-biasing arrangement 48 in transfer case 20 will now be described. Specifically, center differential 22 is provided for mechanically coupling quill shaft 72 to front output shaft 32 and rear output shaft 42 to facilitate speed differentiation while distributing drive torque therebetween. While any suitable differential unit is contemplated for use with transfer case 20, center differential 22 is preferably a dual-planetary gearset having a first sun gear 198 fixed via a splined connection 200 to rear output shaft 42, a second sun gear 202 fixed via a chain drive assembly 204 to front output shaft 32, a set of full-length or first pinion gears 206 each having teeth 208 meshed with teeth 210 of first sun gear 198, and a set of half-length or second pinion gears 212 each having teeth 214 meshed with teeth 208 of one of first pinion gears 206 and teeth 216 of second sun gear 202. Each first pinion gear 206 is rotatably supported on a long pinion shaft 218, the opposite ends of which are mounted in front and rear carrier rings 220 and 222, respectively, of a carrier assembly 224. Similarly, each second pinion gear 206 is rotatably supported on a short pinion shaft 226, the opposite ends of which are likewise mounted to carrier rings 220 and 222. Each set of first pinion gears 206 and second pinion gears 212 is equally-spaced on carrier assembly 224 with one first pinion gear 206 constantly meshed with one second pinion gear 212. Front carrier ring 220 is shown to be coupled via a splined connection 228 to quill shaft 72. A separator ring 230 is located between front carrier ring 220 and first sun gear 198 to facilitate relative rotation therebetween. Likewise, rear carrier ring 222 is shown to be journally supported on second sun gear 202.

Chain drive assembly 204 includes a drive sprocket 232 fixed via a splined connection 234 to second sun gear 202, a driven sprocket 236 fixed via a splined connection 238 to front output shaft 32, and a continuous chain 240 interconnecting driven sprocket 236 to drive sprocket 232. Thus, driven rotation of quill shaft 72 causes center differential 22 to drive front and rear output shafts 32 and 42, respectively, at a predetermined speed ratio with respect to one another. As is known, the torque distribution (i.e., the torque split) normally delivered across center differential 22 to output shafts 32 and 42 is a ratio determined by the particular gear geometry associated with the intermeshed gear components of the dual-planetary gearset. Rear output shaft 42 is shown to have its forward end rotatably supported by a bearing assembly 242 mounted in a piloted bore in input shaft 66 and its rearward end rotatably supported by a bearing assembly 244 mounted to housing 62. Likewise, front output shaft 32 is shown rotatably supported in housing 62 via bearing assemblies 246 and 248. Finally, a front flange 250 and a rear flange 252 are shown respectively mounted to front and rear output shafts 32 and 42 for facilitating otherwise conventional interconnection of each to front and rear drivelines 12 and 14, respectively.

Transfer clutch 50 is installed within transfer case 20 for controlling speed differentiation and the resulting torque distribution between front output shaft 32 and rear output shaft 42. As best seen from FIGS. 2, 3 and 7, transfer clutch 50 is a multi-plate friction clutch assembly which includes an inner drum 254 fixed via a splined connection 256 to second sun gear 202. In particular, inner drum 254 is formed to include an annular hub segment 258 splined to second sun gear 202 and a cylindrical rim segment 259 formed at the opposite end of hub segment 258. Transfer clutch 50 further includes an outer drum 260 shown to have an elongated hub segment 262 fixed via a splined connection 264 to rear output shaft 42, a radial web segment 266 extending from hub segment 262, and a cylindrical rim segment 268 extending forwardly from web segment 266. Rim segment 268 of outer drum 260 is arranged to generally overly and surround rim segment 259 of inner drum 254. Disposed therebetween are two sets of alternately interleaved friction clutch plates that can be frictionally compressed for limiting speed differentiation and biasing the torque distribution across center differential 22. In particular, a set of inner clutch plates 270 are mounted (i.e., splined) to rim segment 259 of inner drum 254 for rotation with second sun gear 202 and front output shaft 32. Likewise, a set of outer clutch plates 274 are mounted (i.e., splined) to rim segment 268 of outer drum 260 for rotation with first sun gear 198 and rear output shaft 42. The interleaved clutch plates 270 and 274 are supported for axial sliding movement to establish frictional contact between. A front thrust plate 278 is splined to rim segment 268 of outer drum 26 for rotation with outer clutch plates 274 and is retained thereon via a retainer ring 280. Likewise, a rear thrust plate 282 is splined to rim segment 268 for rotation with outer clutch plates 274.

Transfer clutch 50 is shown to further include a thrust mechanism 284 supported for axial sliding movement on a tubular sleeve segment 286 of outer drum 260 and which is operable for frictionally compressing the interleaved clutch plates. Thrust mechanism 284 includes a piston 288 having both of its inner and outer peripheral surfaces sealed in a fluid-tight manner relative to sleeve segment 286 and rim segment 268 of outer drum 260 via O-ring seals 290 and 292 to form a pressure chamber 294 therewith. A return spring 296 is disposed under compression between piston 288 and a retainer plate 298 for normally urging piston 288 in a direction away from the interleaved clutch plates. Pressure chamber 294 is in fluid communication with a series (one shown) of passageways 300 formed in hub segment 262 of outer drum 260. A first circumferential groove 302 formed in the outer peripheral surface of hub segment 262 of outer drum 260 communicates with passageways 300 via radial ports 304. As is also seen, a second circumferential groove 306 formed in the outer peripheral surface of hub segment 262 of outer drum 260 communicates with a series (one shown) of radial flow passages 308 which, in turn, communicate with a series (one shown) of radial bores 310 formed in rear output shaft 42. Radial bores 310 communicate with a lubrication bore 312 formed centrally in rear output shaft 42 which, by way of radial ports 314, 316, 318, and 320, provide lubrication to the various components concentrically mounted on rear output shaft 42.

Housing 62 is shown to include a segment, hereinafter referred to as pump housing 322, that is secured to remainder of housing 62 by suitable bolts 64. Pump housing 322 is adapted to surround and enclose hub segment 262 of outer drum 260 as well as support bearing assembly 244. Ring seals 326, 328 and 330 are provided to establish a fluid-tight seal between grooves 302 and 306 and pump housing 322. To provide means for supplying pressurized fluid to first groove 302 for actuating transfer clutch 50 and/or second groove 306 for lubricating the components, mode actuator 54 includes an internally-mounted gerotor pump assembly 332 and an electrically-actuated control valve 360. Pump assembly 332 is mounted in a pump chamber 334 formed in pump housing 322 adjacent to the rear end of layshaft 76. Pump assembly 332 includes a rotor 336 that is fixed via a splined connection to an integral shaft segment 340 of layshaft 76. Thus, rotor 336 is rotatably driven in response to driven rotation of layshaft 76 by input shaft 66. Rotor 336 is an eccentric member having a predetermined number of external tooth-like lobes formed thereon. Pump assembly 332 also includes a pump ring 344 that is non-rotatably fixed within pump chamber 334 of pump housing 322 and includes a predetermined number of internal tooth-like lugs formed therein. In the particular embodiment shown, pump assembly 332 is constructed such that rotor 336 has fourteen lobes intermeshed with fifteen lugs on pump ring 344. An oil feed tube 348 is provided for drawing fluid from a sump area 349 within housing 62, through a filter assembly 350, and into an inlet port 352 of pump assembly 332. Thus, driven eccentric rotation of rotor 336 relative to stationary pump ring 344 delivers pressurized fluid to an outlet port 354 of pump assembly 332.

Preferably, control valve 360 is mounted to pump housing 322 with pump housing 322 formed to include a system of flow passages to provide selective communication between output port 354 of pump assembly 332 and grooves 302 and 306. A supply bore 356 is formed in pump housing 322 to provide fluid communication between outlet port 354 of pump assembly 332 and a supply port 358 of electrically-actuated control valve 360. Control valve 360 includes an electromagnetic solenoid 362 and a spool valve 364 retained for sliding movement in a control chamber formed in pump housing 322. Solenoid 362 is connected to controller 58 to receive electrical control signals therefrom for controlling the position of spool valve 364 within the control chamber. Preferably, spool valve 364 is movable between a first position and a second position in response to controlled actuation of solenoid 362. In the first spool position, supply port 358 is placed in fluid communication with a lubrication passage 368 formed in pump housing 322 for delivering fluid to second groove 306, thereby delivering fluid through lubrication bore 312. Additionally, positioning of spool valve 364 in its first position causes a pump passage 370 formed in pump housing 322, and which communicates with first groove 302, to be placed in fluid communication with an exhaust passage 372. Thus, in the first spool position, return spring 296 is permitted to move piston 288 away from the interleaved clutch plates for forcibly exhausting fluid from within pressure chamber 294. Upon release of pressurized fluid from within pressure chamber 294, the clutch engagement force exerted on interleaved clutch plates 270 and 274 by piston 288 is decreased until transfer clutch 50 is operating in its "non-actuated" state. With transfer clutch 50 operating in its non-actuated state, center differential 22 is unrestricted to facilitate interaxle differentiation between front output shaft 32 and rear output shaft 42. In contrast, when spool valve 364 is shifted to its second spool position, supply port 358 is placed in fluid communication with pump passage 370 in addition to lubrication passage 368 for also supplying pressurized fluid to pressure chamber 294. Increasing fluid pressure within pressure chamber 294 causes piston 288 to be forcibly moved toward the interleaved clutch plates and exert a corresponding clutch engagement force thereon. Concurrently, communication between pump passage 370 and exhaust passage 372 is interrupted, thereby permitting a maximum clutch engagement force to be applied by piston 288 for placing transfer clutch 50 in its "fully-actuated" state. With transfer clutch 50 operating in its fully-actuated state, first and second sun gears 198 and 202 of center differential 22 are locked against relative rotation, thereby inhibiting relative rotation between front output shaft 32 and rear output shaft 42.

According to the present invention, movement of spool valve 364 between its two positions can be controlled under either of an ON/OFF control scheme or an ADAPTIVE control scheme. Under the ON/OFF control scheme, spool valve 364 is moved to one of its two positions in response to the control signals sent to solenoid 362 by controller 58. In such an arrangement, spool valve 364 is normally maintained in its first position such that transfer clutch 50 is likewise maintained in its non-actuated state to permit speed differentiation between front and rear output shafts 32 and 42, respectively. In this condition, transfer case 20 is defined as operating in its full-time "differentiated" four-wheel drive mode. However, when the sensor input signals indicate the occurrence of a vehicular condition exceeding a predetermined value, solenoid 362 is energized for moving spool valve 364 to its second position, whereby transfer clutch 50 is fully-actuated for locking-up center differential 22 such that front and rear output shafts 32 and 42 are, in effect, rigidly coupled for establishing a "non-differentiated" four-wheel drive mode. Preferably, the primary vehicular condition used for controlling actuation of transfer clutch 50 is the interaxle speed differential between front output shaft 32 and rear output shaft 42. Thereafter, controller 58 is operable for returning spool valve 364 to its first position (and transfer clutch 50 to its non-actuation state) when the sensor input signals indicate that the magnitude of the vehicular condition is less than the predetermined value.

Controller 58 can alternatively be programmed utilizing an ADAPTIVE control scheme to regulate the actuated condition of transfer clutch 50 between its non-actuated and fully-actuated limits for proportionally varying the magnitude of speed differentiation and drive torque transmitted across center differential 22 as a function of the magnitude of the sensor input signals. Under such a scenario, control valve 360 would most likely be replaced with a variable orifice-type solenoid-actuated control valve capable of regulating fluid pressure in response to movement of a valve member through a range of motion defined between two distinct valve positions. In operation, transfer clutch 50 increases the drive torque delivered to the slower turning output shaft while concurrently decreases the drive torque delivered to the faster turning output shaft in an amount equal to the torque capacity of transfer clutch 50 at a given actuated state. Under either of the above-noted control schemes, control over actuation of transfer clutch 50 is automatic and does not require any act or mode selection on the part of the vehicle operator.

Transfer case 20 is capable of establishing at least five distinct operative modes, namely, a full-time four-wheel high-range drive mode, a part-time four-wheel high-range drive mode, a Neutral non-driven mode, a full-time four-wheel low-range drive mode, and a part-time four-wheel low-range drive mode. The particular operational mode selected is established by the position of roller pin 174 in range slot 176 and the actuated condition of transfer clutch 50. In operation, the vehicle operator selects a desired operative drive mode via mode select mechanism 60 which, in turn, signals controller 58 of the selection. Thereafter, controller 58 generates an electric control signal that is applied to gearmotor 194 for controlling the rotated position of sector plate 178 and an electric control signal that is applied to solenoid 362 for controlling the actuated state of transfer clutch 50. Mode select mechanism 60 can take the form of any mode selector device which is under the control of the vehicle operator for generating a mode signal indicative of the specific mode selected. In one form, the mode selector device may be an array of dash-mounted push button switches. Alternatively, the mode selector device may be a manually-operable shift lever sequentially movable between a plurality of positions corresponding to the available operational modes which, in conjunction with a suitable electrical switch arrangement, generates a mode signal indicating the mode selected. In either form, mode select mechanism 60 offers the vehicle operator the option of deliberately choosing between the various operative drive modes.

Assuming the availability of all five operative modes, upon selection of either of the part-time four-wheel high-range or low-range drive modes, controller 58 actuates gearmotor 194 for rotating sector plate 178 to its corresponding predefined position, namely its Hi-Range or Lo-Range sector positions. Concurrently, controller 58 actuates solenoid 362 for placing transfer clutch 50 in its fully-actuated state. However, when either of the full-time bur-wheel high-range or low-range drive modes is selected, power transfer system 10 is operable for again rotating sector plate 178 to its corresponding sector position while controlling the actuated condition of transfer clutch 50 as a function of the various sensor and operator-initiated input signals. According to the present invention, when transfer case 20 is operating in either of the full-time four-wheel high-range or low-range drive modes, slip limiting/torque-biasing arrangement 48 is active for "on-demand" control of transfer clutch 50. Specifically, the actuated state of solenoid 362 is continuously monitored and varied in accordance with specific predefined relationships established based on the current value of the sensor input signals under either of the ON/OFF or ADAPTIVE control schemes. Thus, in the full-time four-wheel drive modes, power transfer system 10 acts as an on-demand system for continuously monitoring and automatically regulating the actuated condition of transfer clutch 50 in a manner that is independent of any deliberate action by the vehicle operator.

Power transfer system 10 is also operable to permit transfer case 20 to be shifted out of any available part-time or full-time four-wheel drive modes and into the Neutral non-driven mode. Specifically, upon mode select mechanism 60 signalling selection of the Neutral mode, range actuator 52 is actuated for causing sector plate 178 to rotate to its Neutral sector position, whereby roller pin 174 is positioned centrally within range slot 176 for shifting range sleeve 124 into its Neutral (N) position. Preferably, transfer clutch 50 is maintained in its non-actuated state when transfer case 20 is operating in the Neutral mode. Moreover, while power transfer system 10 is capable of providing five different operative modes, in some applications it may be decided to limit the selection of available drive modes. For example, it is contemplated that mode select mechanism 60 could be easily adapted to permit selection of three drive modes, namely, the full-time four-wheel high-range drive mode, the Neutral mode, and either of the full-time or part-time four-wheel low-range drive mode.

Figure 9:
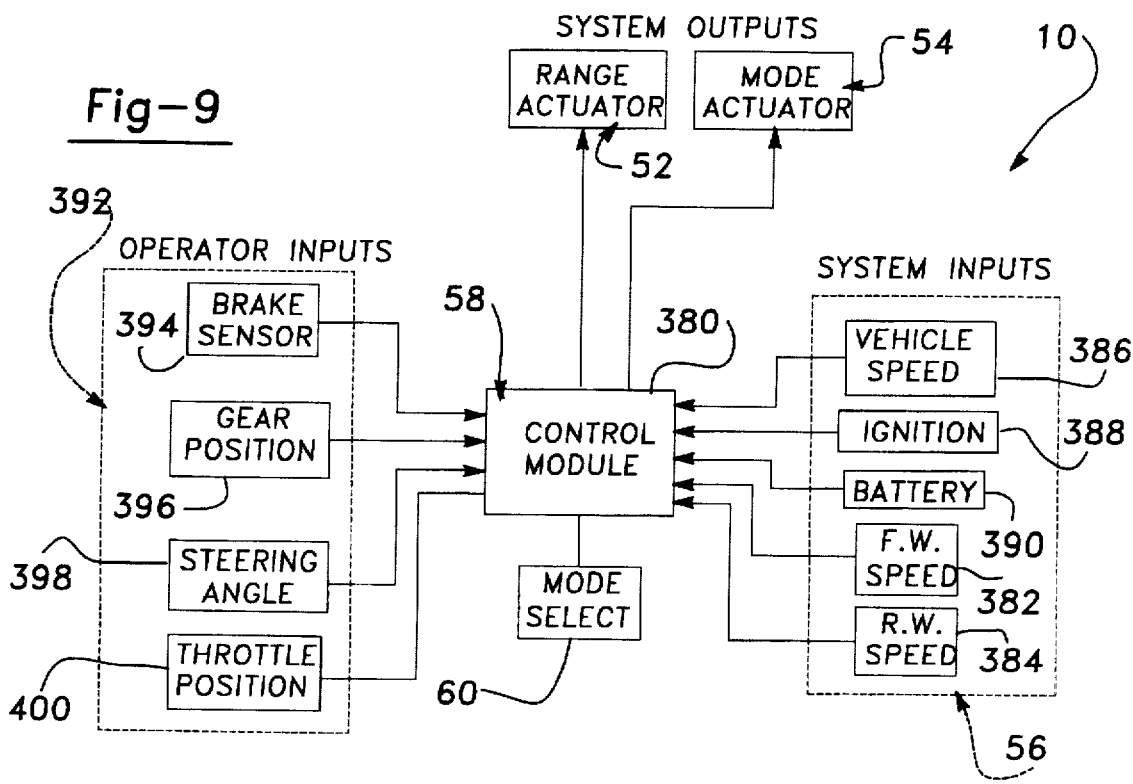
FIG. 9 is a block diagram of a control system for use with the power transfer system of the present invention.

With particular reference now to FIG. 9, a block diagram of a control system associated with power transfer system 10 is shown. Preferably, controller is an electronic control module 380 having signal processing and information storage capabilities. In addition, first sensor group 56 is shown as a group of various "system" sensors that are provided for detecting and signaling specific dynamic and operational characteristics of the motor vehicle. The input signals generated by the "systems" sensors are delivered to electronic control module 380. Preferably, these sensors include a front speed sensor 382 for sensing the rotational speed ($n_F$) of front prop shaft 30, a rear speed sensor 384 for sensing the rotational speed ($n_R$) of rear prop shaft 40, a vehicle speed sensor 386 for sensing a vehicle speed (V), an ignition switch 388 for signalling the operational status of the vehicle, and a battery input 390 for powering electronic control module 380. In vehicles equipped with an anti-lock brake system (ABS), the original equipment ABS sensors provided at each wheel can be used for determining an "average" front shaft speed and rear shaft speed. Alternatively, front and rear speed sensors 382 and 384, respectively, can be arranged for directly measuring the speed of front output shaft 32 and rear output shaft 42, respectively. Moreover, it is possible for vehicle speed sensor 386 to be eliminated with the vehicle speed signal (V) being computed from the lower valued one of rotational speed signals ($n_F$) and ($n_R$). However, it is to be understood that any suitable speed sensing arrangement capable of generating a signal indicative of the rotational speed of a shaft is fairly within the scope of the present invention.

The control system may also utilizes various "operator-initiated" inputs, as generally categorized by a second sensor group 392. These inputs include a brake sensor 394 for sensing when the vehicle operator is applying the brakes, a gear position sensor 396 for sensing a gear position of transmission 18, a steering angle sensor 398 for detecting the magnitude of a steering angle ($\phi$), and an accelerator sensor 400 for sensing an accelerating condition of the vehicle. Preferably, the accelerator sensor 400 is a throttle position sensor for sensing the degree of opening of a throttle valve associated with engine 16 or for sensing the degree of depression of an accelerator pedal and to produce a throttle position signal (A). The operator-initiated input signals are delivered to control module 380 where they are used, in conjunction with the system input signals.

Figure 10:
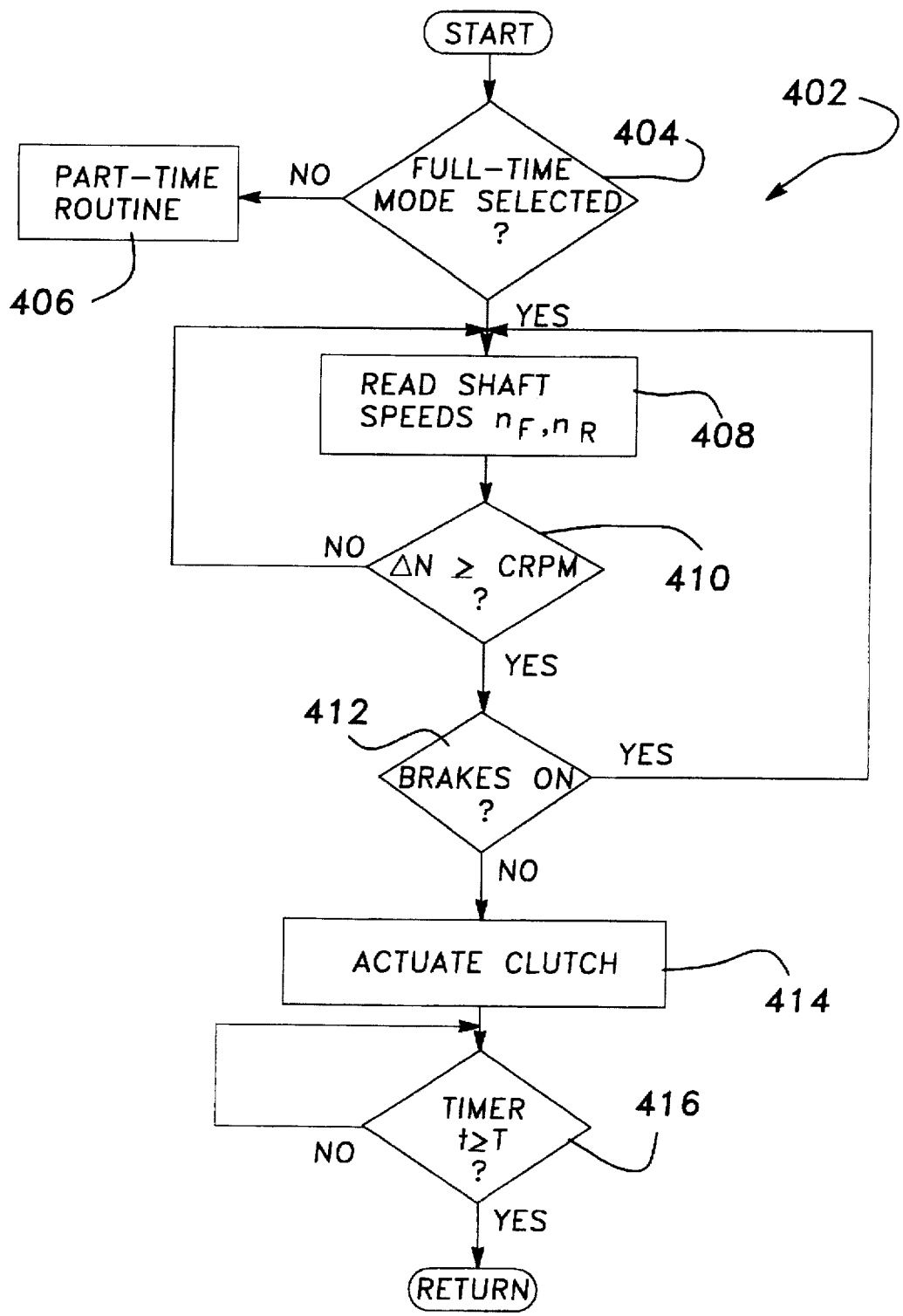
FIG. 10 is a flow chart depicting an ON/OFF control sequence for the operations performed by the control system of FIG. 9.

With reference to FIG. 10, a control sequence for "on-demand" control of the full-time drive modes under the ON/OFF control scheme is shown in a flow chad 402. In general, flow chad 402 represents a sequence of operations performed by electronic control module 380 and which are diagrammatically shown in block form. When mode select mechanism 60 signals selection of an available full-time mode, as indicated by block 404, a succession of control steps are repeated for determining the value of the control signal to be applied to solenoid 362. Preferably, the control signal is selected in accordance with the current value of a front and rear driveline or "interaxle" speed differential (ΔN). However, if any other mode is selected, then the control sequence jumps to a pad-time routine, as indicated by block 406 which controls actuation of range actuator 52 and mode actuator 54 in the manner discussed.

Block 408 is representative of the control step in which the current value of the rotational speed of front drive shaft ($n_f$) and rear drive shaft ($n_r$) are read. In block 410, control module 380 determines the current value of the speed differential (ΔN) and compares it with stored information to determine if the current value of the speed differential signal (ΔN) is equal to or exceeds a predetermined threshold maximum value (CRPM). The threshold maximum value (CRPM) is selected to permit a normal amount of interaxle speed differentiation of the type typically associated with the motor vehicle be steered into a tight turn or corner. Therefore, the maximum threshold value (CRPM) is selected to permit normal interaxle speed differentiation without causing on-demand lock-up of transfer clutch 50. If the current value of the speed differential (ΔN) is less than the maximum threshold level (CRPM), then the control routine returns to the process step of block 408 which is repeated in a continuous manner. Block 412 is indicative of the input signal generated by brake sensor 394 and delivered to control module 380. Accordingly, if the vehicle operator is attempting to stop the vehicle by applying the brakes during the occurrence of a low traction road condition (i.e., ΔN is equal to or greater than CRPM) then control module 380 prevents on-demand activation of transfer clutch 50. Thus, simultaneous braking and on-demand four-wheel drive operation is prevented to provide the vehicle operator with greater control. However, during the occurrence of a low traction condition (where ΔN is equal to or greater than CRPM) and the vehicle operator is not applying the brakes, control module 380 automatically sends an appropriate control signal to solenoid 362 for causing spool valve 364 to move from its first position to its second position, thereby fully-actuating transfer clutch 50, as shown in block 414. As shown in block 416, a timer circuit is actuated upon actuation of solenoid 362 for maintaining the spool valve 364 in its second position for a predetermined time period (T). Once the period of solenoid actuation (t) equals the predetermined time period (T), control module 380 repeats the control routine. Thus, transfer clutch 50 will be maintained in its fully-actuated state until the calculation at block 410 indicates that the current value of the speed differential (ΔN) has fallen below the maximum threshold level (CRPM).

Figure 11:
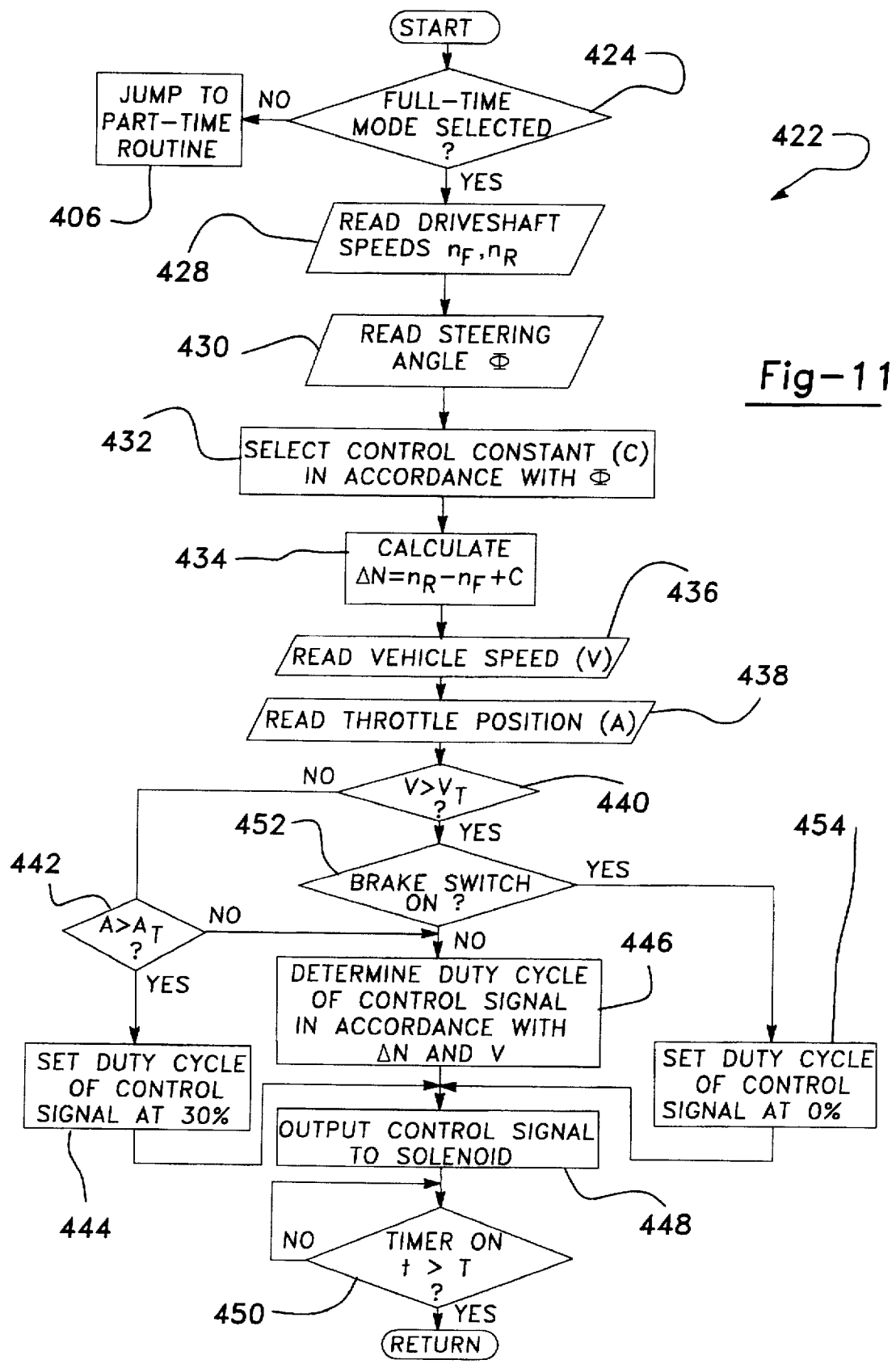
FIG. 11 is a flow chart depicting an ADAPTIVE control sequence for the operations performed by the control system of FIG. 9.

With reference now to FIG. 11, a control sequence for the selection and the subsequent "on-demand" control of the full-time drive modes under the ADAPTIVE control scheme is shown in a flow chart 422. In general, flow chart 422 represents a sequence of operations performed by electronic control module 380 which are diagrammatically shown in block form. When mode select mechanism 60 signals selection of an available full-time mode, as indicated by block 424, a succession of control steps are repeated for determining the value of the control signal to be applied to solenoid 362. As noted, under the ADAPTIVE scheme, control valve 360 would be of a variable output type so as to permit continuous pressure regulation. In the preferred form, the control signal is selected in accordance with various predefined relationships between the current value of the interaxle speed differential (ΔN) and vehicle speed (V), as modified by current value of the steering angle (φ) and other operator-initiated inputs. However, if any other mode is selected, then the control sequence jumps to a part-time routine, as indicated by block 406. Block 428 is representative of the control step in which the current value of the rotational speed of front drive shaft ($n_F$) and rear drive shaft ($n_R$) are read. Block 430 indicates the step of reading the value of steering angle (φ) as detected by steering angle sensor 398. Block 432 represents the operation of selecting a control characteristic (C) in accordance with the detected steering angle (φ). Next, block 434 represents the step of calculating the value of the speed differential (ΔN) according to the equation $$\Delta N = n_R - n_F + C$$

Blocks 436 and 438 indicate the steps of reading the current value of the vehicle speed (V) as detected by vehicle speed sensor 386 and the throttle position (A) as detected by throttle position sensor 400. As shown in block 440, control module 380 determines whether the vehicle speed (V) exceeds a predefined threshold value ($V_T$) such as, for example, 5 mph. If the vehicle speed is less than the threshold value ($V_T$), a second determination is made at block 442 as to whether the value of the throttle position (A) exceeds a predefined threshold value ($A_T$) such as, for example, a 50% accelerator pedal depression angle. If the vehicle speed (V) is less than its threshold value ($V_T$) and the throttle position (A) exceeds its threshold value ($A_T$), then the magnitude (i.e., percentage of duty cycle) of the electric control signal is set as a preset value, such as 30% duty cycle, as indicated by block 444. In this manner, power transfer system 10 is adapted to transfer increased drive torque to front wheels 24 in response to quick acceleration at low vehicle speeds to inhibit anticipated wheel slip. However, if the value of the throttle position (A) is less than its threshold value ($A_T$), then the magnitude of the duty cycle for the control signal is set in accordance with predefined relationships between the speed differential (ΔN) and vehicle speed (V), as indicated by block 446. Block 448 represents the step of outputting the electric control signal to solenoid 362 for developing the desired amount of torque transfer, if any, across transfer clutch 50. As shown in block 450, a timer circuit actuated simultaneously with energization of solenoid 362 for maintaining such energization for a predetermined time period (T). Once the period of energization (t) equals the predetermined time period (T), control module 380 repeats the control routine.

To enhance steering control, block 452 is indicative of the control step between steps 440 and 446 for determining whether the vehicle operator is applying the brakes when the vehicle speed (V) is greater than the threshold value ($V_T$). Accordingly, if the vehicle operator is attempting to stop the vehicle, by applying the brakes (as sensed by brake sensor 394) during an occurrence of a low traction road condition and the vehicle speed (V) is greater than the predefined threshold ($V_T$), then control module 380 sets the magnitude of the control signal sent to solenoid 362 to zero, as shown by block 454, for de-actuating transfer clutch 50. This control sequence prevents simultaneous braking and torquemodulated full-time four-wheel drive operation for providing the vehicle operator with greater steering and braking control. However, during the occurrence of a low traction condition when brake sensor 394 signals control module 380 that the vehicle operator is not applying the brakes, electronic control module 380 automatically energizes solenoid 362 for actuating transfer clutch 50 in accordance with the relationships generally denoted by block 446.

Figure 12:
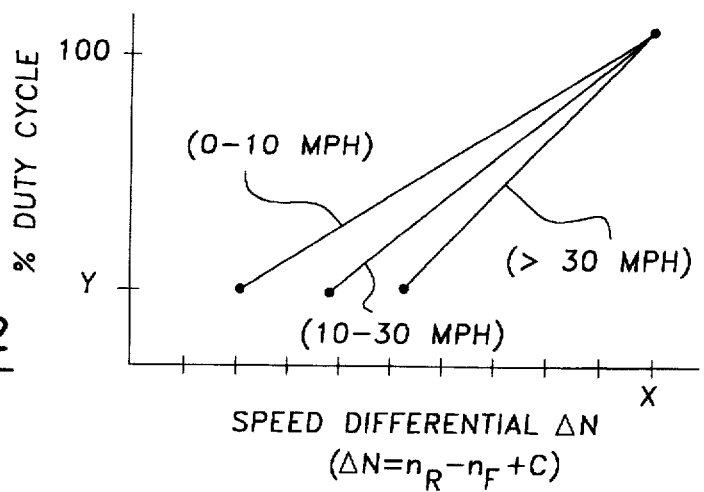
FIG. 12 illustrates plots of relationships between interaxle speed differential signals at various vehicle speed ranges and the electrical control signal supplied by the control system to the clutch actuator for controlling the amount of torque transferred through the clutch assembly.

With particular reference to FIG. 12, a set of plots are shown that can be used with the ADAPTIVE control scheme for establishing the magnitude of the duty cycle in response to the current value of the speed differential (ΔN) and the vehicle speed (V), as diagrammatically referred to by block 446 in FIG. 11. As seen, power transfer system 10 can be programmed to correlate the percentage duty cycle of the electric control signal to a range of speed differential (ΔN) values. In general, the percentage duty cycle for the control signal increases from a minimum actuation value (Y%) to a maximum actuation value (100%) as the value of the speed differential (ΔN), within a particular vehicle speed range, increases from a minimum speed differential limit to a maximum speed differential limit (X). As such, when the value of the speed differential (ΔN) is less than the minimum speed differential limit, no drive torque is transferred through transfer clutch 50. However, when the value of the speed differential (ΔN) exceeds the minimum differential limit, a control signal is supplied to solenoid 362 having a duty cycle value greater than (Y%). Thus, the minimum actuation duty cycle (Y%) for the control signal correlates to the point at which piston 288 exerts a sufficient clutch engagement force on the interleaved clutch plates results to deliver increased drive torque to the slower turning output shaft of transfer case 20 for initiating "on-demand" slip control during a full-time four-wheel drive operation.

Preferably, the portion of the total drive torque transferred through transfer clutch 50 to the slower turning output shaft increases as the magnitude of the duty cycle for the control signal increases from the minimum actuation value (Y%) to the maximum actuation value (100%). Preferably, the maximum value (X) of the speed differential (ΔN) correlates to the maximum actuation duty cycle (100%) at which point the maximum clutch engagement force is generated for completely locking-up transfer clutch 50. As mentioned, part-time routine 406 is directed to controlling power transfer system 10 when the vehicle operator selects an available operational mode via mode select mechanism 60 other than one of the full-time four-wheel drive modes. Specifically, control module 380 is adapted to supply a control signal to gearmotor 194 for rotating sector plate 178 to the particular sector position corresponding to the selected range while a control signal sent to solenoid 362 controls actuation of transfer clutch 50.

Due to the use of bi-directional synchronized range shift mechanism 46, transfer case 20 can be shifted "on-the-fly" into any available drive mode without the requirement that the motor vehicle be in a non-motive condition. If desired, controller 58 can be programmed to prevent high-range to low-range shifts when the vehicle speed exceeds a predetermined speed, most preferably in the range of about 30 to 50 miles per hour. Alternatively, centrifugal-type shift inhibitors can be used with the synchronizers to mechanically prevent such high-range to low-range shifts above a certain vehicle speed. As will also be appreciated, any suitable type of synchronizer device (i.e., single-cone, dual-cone, multi-cone, strut-type, strutless, etc.) can be used with synchronized range shift mechanism 46. If a mechanically-actuated shift mechanism is provided in substitution for range actuator 52, the mode signal would be used to still identify the drive mode selected for permitting controller 58 to control mode actuator 54 as required.

The foregoing discussion discloses and describes the preferred structure and control systems for the present invention. However, one skilled in the art will readily recognize from such discussion, and from the accompanying drawings and claims, that various changes, modifications and variations can be made therein without departing from the true spirit and fair scope of the invention as defined in the following claims.

What is claimed is:

1. A power transfer system for a four-wheel drive motor vehicle having a power source and front and rear drivelines, comprising:

a transfer case including a housing; an input shaft rotatably supported in said housing and driven by the power source; a front output shaft rotatably supported in said housing and coupled to the front driveline; a rear output shaft rotatably supported in said housing and coupled to the rear driveline; a quill shaft supported on said rear output shaft for rotation relative thereto; a gear reduction unit operable for defining a high-range drive mode whereat said quill shaft is driven at a direct speed ratio relative to said input shaft and a low-range drive mode whereat said quill shaft is driven at a reduced speed ratio relative to said input shaft, said gear reduction unit including a layshaft rotatably supported in said housing and having first and second gears secured thereto, a high-range gear secured to said input shaft that is meshed with said first gear on said layshaft, and a low-range gear rotatably supported on said quill shaft that is meshed with and rotatably driven by said second gear on said layshaft; a clutch apparatus including a range sleeve supported for rotation with said quill shaft and movement between a first range position whereat said range sleeve couples said input shaft to said quill shaft for establishing said high-range drive mode and a second range position whereat said range sleeve couples said low-range gear to said quill shaft for establishing said low-range drive mode, and synchronizer means for causing speed synchronization between said input shaft and said quill shaft in response to movement of said range sleeve to said first range position, said synchronizer means further operable for causing speed synchronization between said quill shaft and said low-range gear in response to movement of said range sleeve to said second range position; a range actuator for moving said range sleeve; an interaxle differential interconnecting said quill shaft to said front and rear output shafts for permitting speed differentiation therebetween, said interaxle differential including a first sun gear fixed for rotation with said rear output shaft, a second sun gear rotatably supported on said rear output shaft and operably coupled to said front output shaft for rotation therewith, and a carrier assembly fixed for rotation with said quill shaft and having pinion gears journally supported therefrom that are meshed with said first and second sun gears; a transfer clutch operable for controlling speed differentiation between said front and rear output shafts, said transfer clutch including a set of first clutch plates supported for rotation with said front output shaft, a set of second clutch plates supported for rotation with said rear output shaft and which are alternately interleaved with said first clutch plates, a thrust mechanism movable between a first mode position whereat a minimum clutch engagement force is exerted on said clutch plates for permitting unrestricted speed differentiation between said front and rear output shafts and a second mode position whereat a maximum clutch engagement force is exerted on said clutch plates for inhibiting speed differentiation, and a biasing mechanism for normally biasing said thrust mechanism toward said first mode position; and a mode actuator for selectively moving said thrust mechanism;

sensor means for detecting dynamic and operational characteristics of the motor vehicle and generating sensor input signals indicative thereof;

a mode select mechanism for enabling a vehicle operator to select one of a full-time four-wheel high-range drive mode and apart-time four-wheel low-range drive mode and generating a mode signal indicative of the particular mode selected; and a controller for controlling actuation of said range and mode actuators in response to said mode signal and said sensor input signals, said controller causing said range actuator to move said range sleeve to said first range position and said mode actuator to move said thrust mechanism between said first and second mode positions as a function of said sensor input signals for automatically controlling speed differentiation between said front and rear output shafts when said mode signal indicates selection of said full-time four-wheel high-range drive mode, and said controller causing said range actuator to move said range sleeve to said second range position and said mode actuator to move said thrust mechanism to said second mode position when said mode signal indicates selection of said part-time four-wheel low-range drive mode.

2. The power transfer system of claim 1 wherein said mode select mechanism is further operable for enabling the vehicle operator to select a part-time four-wheel high-range drive mode and generate a mode signal indicative thereof, said controller causing said range actuator to move said range sleeve to said first range position and said mode actuator to move said thrust mechanism to said second mode position when said mode signal indicates selection of said part-time four-wheel high-range drive mode.

3. The power transfer system of claim 1 wherein said range sleeve is movable to a third range position whereat said quill shaft is uncoupled from said input shaft and said low-range gear for establishing a non-driven mode, and wherein said mode select mechanism is operable for enabling the vehicle operator to select a neutral mode with a mode signal indicative thereof causing said controller to actuate said range actuator to move said range sleeve to said third range position and said mode actuator to move said thrust mechanism to said first mode position.

4. The power transfer system of claim 1 wherein said transfer clutch is non-actuated when said thrust mechanism is in said first mode position and is fully-actuated when said thrust mechanism is in said second mode position, and wherein the actuated condition of said transfer clutch is continuously varied between said non-actuated and fully-actuated states in response to changes in the magnitude of said sensor input signals for automatically controlling speed differentiation between said front and rear output shafts during operation in said full-time four-wheel high-range drive mode.

5. The power transfer system of claim 1 wherein said clutch apparatus includes a first clutch plate fixed to said high-range gear, a second clutch plate fixed to said low-range gear, and a clutch hub fixed for rotation with said quill shaft and on which said range sleeve is supported for rotation therewith and axial sliding movement thereon between said first and second range positions, and wherein said synchronizer means includes a first synchronizer assembly disposed between said clutch hub and said first clutch plate for facilitating speed synchronization between said input shaft and said quill shaft in response to movement of said range sleeve to said first range position whereat said range sleeve couples said clutch hub to said first clutch plate, said synchronizer means further including a second synchronizer assembly operably disposed between said clutch hub and said second clutch plate for causing speed synchronization between said quill shaft and said low-range gear in response to movement of said range sleeve to said second range position whereat said range sleeve couples said clutch hub to said second clutch plate.

6. The power transfer system of claim 1 wherein said sensor means is operative for sensing the rotational speed of said front and rear output shafts and respectively generating front and rear speed signals indicative thereof, and further wherein said controller is operative for receiving said front and rear speed signals and generating a speed differential signal that is indicative of the speed differential between said front and rear output shafts, said controller operable for causing said mode actuator to move said thrust mechanism toward said second mode position in response to increasing values in said speed differential signal.

7. The power transfer system of claim 1 further comprising a shift assembly interconnecting said range sleeve to said range actuator such that actuation of said range actuator causes said shift assembly to move said range sleeve between its various range positions.

8. The power transfer system of claim 1 wherein said transfer clutch includes an inner drum fixed to said second sun gear and on which said first clutch plates are mounted, and an outer drum fixed for rotation with said rear output shaft and to which said second clutch plates are mounted, and wherein said thrust mechanism is a piston supported for movement relative to said outer drum and defining a pressure chamber therewith, said mode actuator including a source of pressurized fluid and a control valve operable in response to control signals from said controller for regulating the supply of pressurized fluid to said pressure chamber for moving said piston between said first and second mode positions.

9. The power transfer system of claim 8 wherein said source of pressurized fluid includes a sump area within said housing containing hydraulic fluid, and a pump assembly operable for drawing said hydraulic fluid from said sump area and supplying pressurized fluid to said control valve.

10. The power transfer system of claim 9 wherein said pump assembly is a gerotor pump having a toothed pump ring fixed to said housing and a toothed rotor meshed with said toothed pump ring, said rotor being fixed for rotation with said layshaft for delivering pressurized fluid to said control valve in response to rotation of said layshaft.

11. A power transfer system for a four-wheel drive motor vehicle having a power source and front and rear drivelines, comprising:

a transfer case including a housing; an input shaft rotatably supported in said housing and driven by the power source; a front output shaft rotatably supported in said housing and coupled to the front driveline; a rear output shaft rotatably supported in said housing and coupled to the rear driveline; a quill shaft supported on said rear output shaft for rotation relative thereto; a gear reduction unit operable for defining a high-range drive mode whereat said quill shaft is driven at a direct speed ratio relative to said input shaft and a low-range drive mode whereat said quill shaft is driven at a reduced speed ratio relative to said input shaft, said gear reduction unit including a layshaft rotatably supported in said housing and having first and second gears secured thereto, a high-range gear secured to said input shaft that is meshed with said first gear on said layshaft, and a low-range gear rotatably supported on said quill shaft that is meshed with and rotatably driven by said second gear on said layshaft; a clutch apparatus including a range sleeve supported for rotation with said quill shaft and movement between a first range position whereat said range sleeve couples said input shaft to said quill shaft for establishing said high-range drive mode, a second range position whereat said range sleeve couples said low-range gear to said quill shaft for establishing said low-range drive mode, and a third range position whereat said range sleeve uncouples said quill shaft from said input shaft and said low-range gear for establishing a non-driven mode, and synchronizer means for causing speed synchronization between said input shaft and said quill shaft in response to movement of said range sleeve to said first range position, said synchronizer means further operable for causing speed synchronization between said quill shaft and said low-range gear in response to movement of said range sleeve to said second range position; a range actuator for moving said range sleeve; an interaxle differential interconnecting said quill shaft to said front and rear output shafts for permitting speed differentiation therebetween, said interaxle differential including a first sun gear fixed for rotation with said rear output shaft, a second sun gear rotatably supported on said rear output shaft and operably coupled to said front output shaft for rotation therewith, and a carrier assembly fixed for rotation with said quill shaft, said carrier assembly having a first pinion gear journally supported thereon that is meshed with said first sun gear and a second pinion gear journally supported thereon that is meshed with said second sun gear and said first pinion gear; a transfer clutch operable for controlling speed differentiation between said front and rear output shafts, said transfer clutch including a set of first clutch plates supported for rotation with said front output shaft, a set of second clutch plates supported for rotation with said rear output shaft and which are alternately interleaved with said first clutch plates, a thrust mechanism movable between a first mode position whereat a minimum clutch engagement force is exerted on said clutch plates for permitting unrestricted speed differentiation between said front and rear output shafts and a second mode position whereat a maximum clutch engagement force is exerted on said clutch plates for inhibiting speed differentiation, and a biasing mechanism for normally biasing said thrust mechanism toward said first mode position; and a mode actuator for selectively moving said thrust mechanism;

sensor means for detecting dynamic and operational characteristics of the motor vehicle and generating sensor input signals indicative thereof;

a mode select mechanism for enabling a vehicle operator to select one of a full-time four-wheel high-range drive mode, a part-time four-wheel low-range drive mode and a neutral mode, said mode select mechanism further operable for generating a mode signal indicative of the particular mode selected; and a controller for controlling actuation of said range and mode actuators in response to said mode signal and said sensor input signals, said controller causing said range actuator to move said range sleeve to said first range position and said mode actuator to move said thrust mechanism between said first and second mode positions as a function of said sensor input signals for automatically controlling speed differentiation between said front and rear output shafts when said mode signal indicates selection of said full-time four-wheel high-range drive mode, said controller causing said range actuator to move said range sleeve to said second range position and said mode actuator to move said thrust mechanism to said second mode position when said mode signal indicates selection of said part-time four-wheel low-range drive mode, and said controller causing said range actuator to move said range sleeve to said third range position and said mode actuator to move said thrust mechanism to said first mode position when said mode signal indicates selection of said neutral mode.

12. The power transfer system of claim 11 wherein said mode select mechanism is further operable for enabling the vehicle operator to select a part-time four-wheel high-range drive mode and generate a mode signal indicative thereof, said controller causing said range actuator to move said range sleeve to said first range position and said mode actuator to move said thrust mechanism to said second mode position when said mode signal indicates selection of said part-time four-wheel high-range drive mode.

13. The power transfer system of claim 11 wherein said transfer clutch is non-actuated when said thrust mechanism is in said first mode position and is fully-actuated when said thrust mechanism is in said second mode position, and wherein the actuated condition of said transfer clutch is continuously varied between said non-actuated and fully-actuated states in response to changes in the magnitude of said sensor input signals for automatically controlling speed differentiation between said front and rear output shafts during operation in said full-time four-wheel high-range drive mode.

14. The power transfer system of claim 11 wherein said clutch apparatus includes a first clutch plate fixed to said high-range gear, a second clutch plate fixed to said low-range gear, and a clutch hub fixed for rotation with said quill shaft and on which said range sleeve is supported for rotation therewith and axial sliding movement thereon between said various range positions, and wherein said synchronizer means includes a first synchronizer assembly disposed between said clutch hub and said first clutch plate for facilitating speed synchronization between said input shaft and said quill shaft in response to movement of said range sleeve from said third range position to said first range position whereat said range sleeve couples said clutch hub to said first clutch plate, said synchronizer means further including a second synchronizer assembly operably disposed between said clutch hub and said second clutch plate for causing speed synchronization between said quill shaft and said low-range gear in response to movement of said range sleeve from said third range position to said second range position whereat said range sleeve couples said clutch hub to said second clutch plate.

15. The power transfer system of claim 11 wherein said sensor means is operative for sensing the rotational speed of said front and rear output shafts and respectively generating front and rear speed signals indicative thereof, and further wherein said controller is operative for receiving said front and rear speed signals and generating a speed differential signal that is indicative of the speed differential between said front and rear output shafts, said controller operable for causing said mode actuator to move said thrust mechanism toward said second mode position in response to increasing values in said speed differential signal.

16. The power transfer system of claim 11 further comprising a shift assembly interconnecting said range sleeve to said range actuator such that actuation of said range actuator causes said shift assembly to move said range sleeve between its various range positions.

17. The power transfer system of claim 11 wherein said transfer clutch includes an inner drum fixed to said second sun gear and on which said first clutch plates are mounted, and an outer drum fixed for rotation with said rear output shaft and to which said second clutch plates are mounted, and wherein said thrust mechanism is a piston supported for movement relative to said outer drum and defining a pressure chamber therewith, said mode actuator including a source of pressurized fluid and a control valve operable in response to signals from said controller for controlling the supply of pressurized fluid to said pressure chamber for moving said piston from said first mode position toward its second mode position.

18. The power transfer system of claim 17 wherein said source of pressurized fluid includes a sump area within said housing containing hydraulic fluid, and a pump assembly operable for drawing said hydraulic fluid from said sump area and supplying pressurized fluid to said control valve.

19. The power transfer system of claim 18 wherein said pump assembly is a gerotor pump having a toothed pump ring fixed to said housing and a toothed rotor meshed with said pump ring, said rotor being fixed for rotation with said layshaft for delivering pressurized fluid to said control valve in response to rotation of said layshaft.

* * * * *